United States Patent
Huang

(10) Patent No.: US 8,661,691 B2
(45) Date of Patent: Mar. 4, 2014

(54) GARDEN SHEARS

(75) Inventor: Yao-Chung Huang, Chang Hua Hsien (TW)

(73) Assignee: Ho Cheng Garden Tools Co., Ltd., Chang Hua Hsien (TW)

( * ) Notice: Subject to any disclaimer, the term of this patent is extended or adjusted under 35 U.S.C. 154(b) by 363 days.

(21) Appl. No.: 13/009,857

(22) Filed: Jan. 20, 2011

(65) Prior Publication Data

US 2012/0186087 A1  Jul. 26, 2012

(51) Int. Cl.
  *B26B 13/00* (2006.01)
  *B26B 17/00* (2006.01)

(52) U.S. Cl.
  USPC .................. 30/254; 30/245; 30/251

(58) Field of Classification Search
  USPC ........... 30/190, 192, 193, 244, 245, 248–252, 30/253–254; D8/5; 81/415, 416; 606/174, 606/175
  See application file for complete search history.

(56) References Cited

U.S. PATENT DOCUMENTS

| | | | | |
|---|---|---|---|---|
| 103,197 | A * | 5/1870 | Kellogg | 30/254 |
| 476,459 | A * | 6/1892 | Hamann et al. | 30/252 |
| 488,959 | A * | 12/1892 | Brandenburg | 30/250 |
| 1,577,140 | A * | 3/1926 | Mitchell | 30/250 |
| 2,512,334 | A * | 6/1950 | Johnson | 30/251 |
| 2,816,359 | A * | 12/1957 | Hogue et al. | 30/250 |
| 4,525,929 | A * | 7/1985 | Brophy et al. | 30/181 |
| 4,980,975 | A * | 1/1991 | Hodson | 30/254 |
| 5,020,222 | A * | 6/1991 | Gosselin et al. | 30/251 |
| 5,159,757 | A * | 11/1992 | Weid et al. | 30/251 |
| 5,544,416 | A * | 8/1996 | Lin | 30/193 |
| 5,809,654 | A * | 9/1998 | Huang | 30/250 |
| 5,950,314 | A * | 9/1999 | Chang | 30/244 |
| D434,286 | S * | 11/2000 | Lin | D8/5 |
| D437,751 | S * | 2/2001 | Lin | D8/5 |
| 6,345,446 | B1 * | 2/2002 | Huang | 30/250 |
| D479,960 | S * | 9/2003 | Huang | D8/5 |
| D481,273 | S * | 10/2003 | Huang | D8/5 |
| 6,662,451 | B1 * | 12/2003 | Cheng | 30/199 |
| 6,681,492 | B1 * | 1/2004 | Huang | 30/250 |
| 6,829,829 | B1 * | 12/2004 | Huang | 30/252 |
| 7,296,325 | B1 * | 11/2007 | Putumbaka et al. | 16/361 |
| 7,530,172 | B1 * | 5/2009 | Wu | 30/250 |
| 7,640,666 | B1 * | 1/2010 | Huang | 30/234 |
| 7,810,242 | B1 * | 10/2010 | Lynch | 30/254 |

(Continued)

FOREIGN PATENT DOCUMENTS

| | | | | |
|---|---|---|---|---|
| GB | 2397546 | A | * | 7/2004 |
| GB | 2444912 | A | * | 6/2008 |
| GB | 2459449 | A | * | 10/2009 |
| GB | 2466358 | A | * | 6/2010 |

*Primary Examiner* — Jason Daniel Prone

(57) ABSTRACT

Garden shears includes two corresponding cutting members, two opposing applying arms and two assembling members. Each cutting member has a main pivot aperture at a middle section thereof, a blade portion above the main pivot aperture, a pushing arc and a sliding arc continuously disposed below the main pivot aperture and a protrusion disposed between the pushing arc and the sliding arc, and an adjustable slot at a lower section. Each applying arm has a driving pivot aperture at a middle section, an eccentric pivot aperture at a top section, a rotation portion corresponding to the sliding arc formed at a top edge, a pushing edge formed at a side of the rotation portion, an indentation formed between the rotation portion and the pushing edge, and a handle at a lower section; wherein the assembling member is a flat member and has at least one securing aperture.

3 Claims, 8 Drawing Sheets

(56) References Cited

U.S. PATENT DOCUMENTS

| | | | | |
|---|---|---|---|---|
| D634,594 S | * | 3/2011 | Huang | D8/5 |
| D634,993 S | * | 3/2011 | Huang | D8/5 |
| D634,994 S | * | 3/2011 | Huang | D8/5 |
| D634,995 S | * | 3/2011 | Huang | D8/5 |
| D635,416 S | * | 4/2011 | Huang | D8/5 |
| D638,674 S | * | 5/2011 | Huang | D8/5 |
| D638,675 S | * | 5/2011 | Huang | D8/5 |
| D638,676 S | * | 5/2011 | Huang | D8/5 |
| D638,677 S | * | 5/2011 | Huang | D8/5 |
| 8,166,659 B2 | * | 5/2012 | Huang | 30/254 |
| 8,220,164 B2 | * | 7/2012 | Linden et al. | 30/252 |
| 8,225,513 B2 | * | 7/2012 | Huang | 30/254 |
| 8,327,549 B2 | * | 12/2012 | Huang | 30/251 |
| 2003/0136008 A1 | * | 7/2003 | Lin | 30/250 |
| 2009/0044412 A1 | * | 2/2009 | Hsieh | 30/252 |
| 2010/0043238 A1 | * | 2/2010 | Linden et al. | 30/251 |
| 2010/0162575 A1 | * | 7/2010 | Lin | 30/245 |
| 2010/0269357 A1 | * | 10/2010 | Shan | 30/254 |
| 2011/0154668 A1 | * | 6/2011 | Liu et al. | 30/252 |
| 2011/0296694 A1 | * | 12/2011 | Huang | 30/254 |
| 2012/0017445 A1 | * | 1/2012 | Huang | 30/192 |
| 2012/0131802 A1 | * | 5/2012 | Huang | 30/249 |
| 2012/0137527 A1 | * | 6/2012 | Huang | 30/185 |
| 2012/0151781 A1 | * | 6/2012 | Huang | 30/251 |
| 2012/0186087 A1 | * | 7/2012 | Huang | 30/252 |
| 2012/0198705 A1 | * | 8/2012 | Huang | 30/244 |
| 2013/0152404 A1 | * | 6/2013 | Huang | 30/250 |

* cited by examiner

GARDEN SHEARS

BACKGROUND OF THE INVENTION

1. Field of the Invention

The present invention relates to garden shears, and more particularly to garden shears requiring less operating strength.

2. Description of the Related Art

Gardening has become a popular hobby for many people; it can help to reduce stress and improve the environmental atmosphere. Therefore, gardening tools are necessary for maintenance. Most typical garden shears, as shown in FIG. 8, comprise two cutting members 50 and a shaft pin 60. The two cutting members 50 are crossover assembled and pivoted by the shaft pin 60. A blade portion 51 is disposed at one end of each cutting member 50, and a handle 62 is disposed at another end of each cutting member 50. Users can hold the handles 62 to operate the blade portions 51 for cutting movements. However, users usually need to apply great strength to operate the garden shears.

Therefore, it is desirable to provide garden shears to mitigate and/or obviate the aforementioned problems.

SUMMARY OF THE INVENTION

An objective of the present invention is to provide garden shears requiring less strength to operate.

In order to achieve the above-mentioned objective, garden shears of the embodiment of the present invention comprise two corresponding cutting members, two opposing applying arms and two assembling members. Each cutting member has a main pivot aperture at a middle section thereof, a blade portion above the main pivot aperture, a pushing arc and a sliding arc continuously disposed below the main pivot aperture and a protrusion disposed between the pushing arc and the sliding arc, and an adjustable slot at a lower section. Each applying arm has a driving pivot aperture at a middle section, an eccentric pivot aperture at a top section, a rotation portion corresponding to the sliding arc formed at a top edge, a pushing edge formed at a side of the rotation portion, an indentation formed between the rotation portion and the pushing edge, and a handle at a lower section. The assembling member is a flat member and has at least one securing aperture.

With the above-mentioned structure, the following benefits can be obtained: when a user presses the handles of the applying arms together, the cutting members are driven to close together to perform a cutting movement, such that the pushing edge of the applying arm generates a rotatable pushing force on the pushing arc. Furthermore, when the blade portion is cutting into the target object, and the interaction between the blade portion and the target object increases, which requires a stronger application force, the driving pivot aperture moves downwardly in the adjustable slot to increase the torque for the blade portion.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
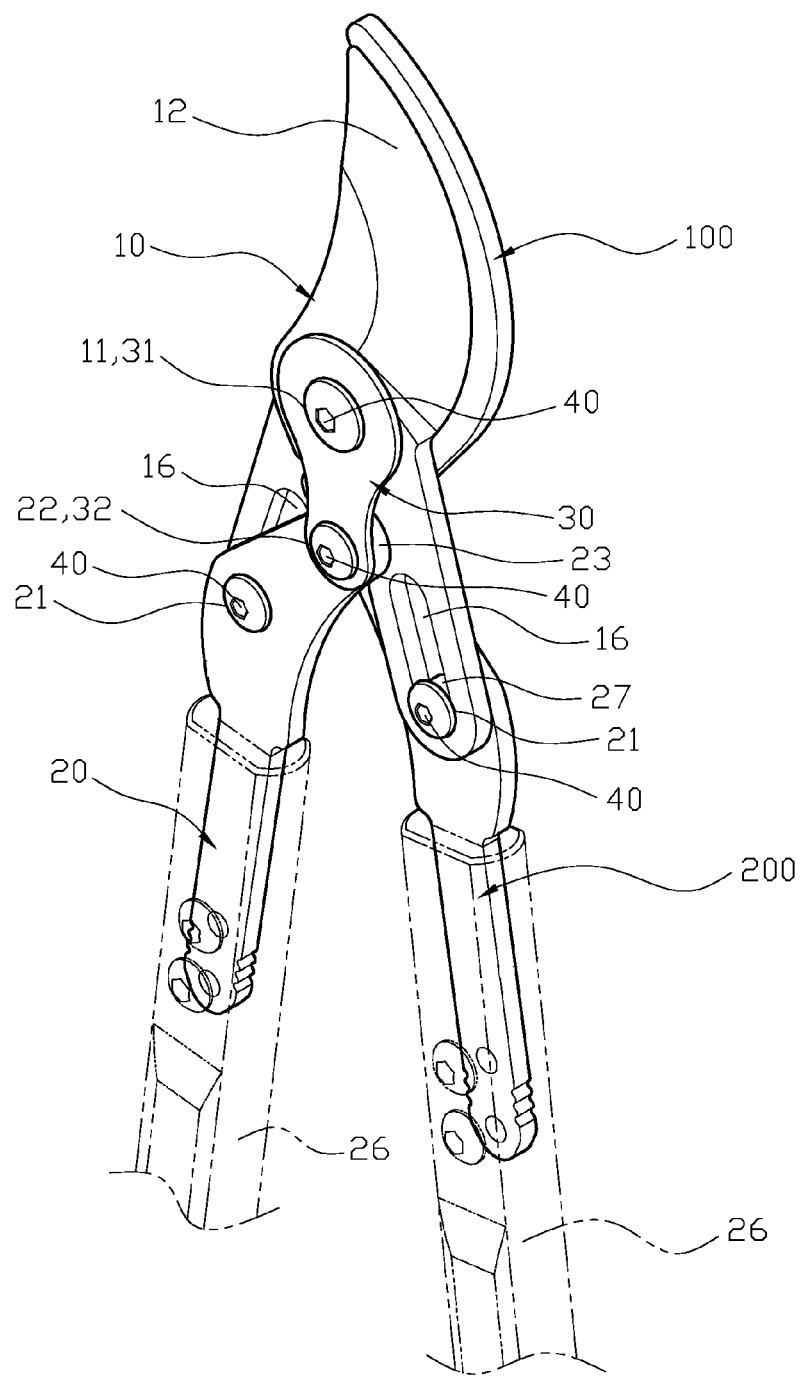
FIG. 1 is a perspective view of an embodiment of the present invention.
Figure 2:
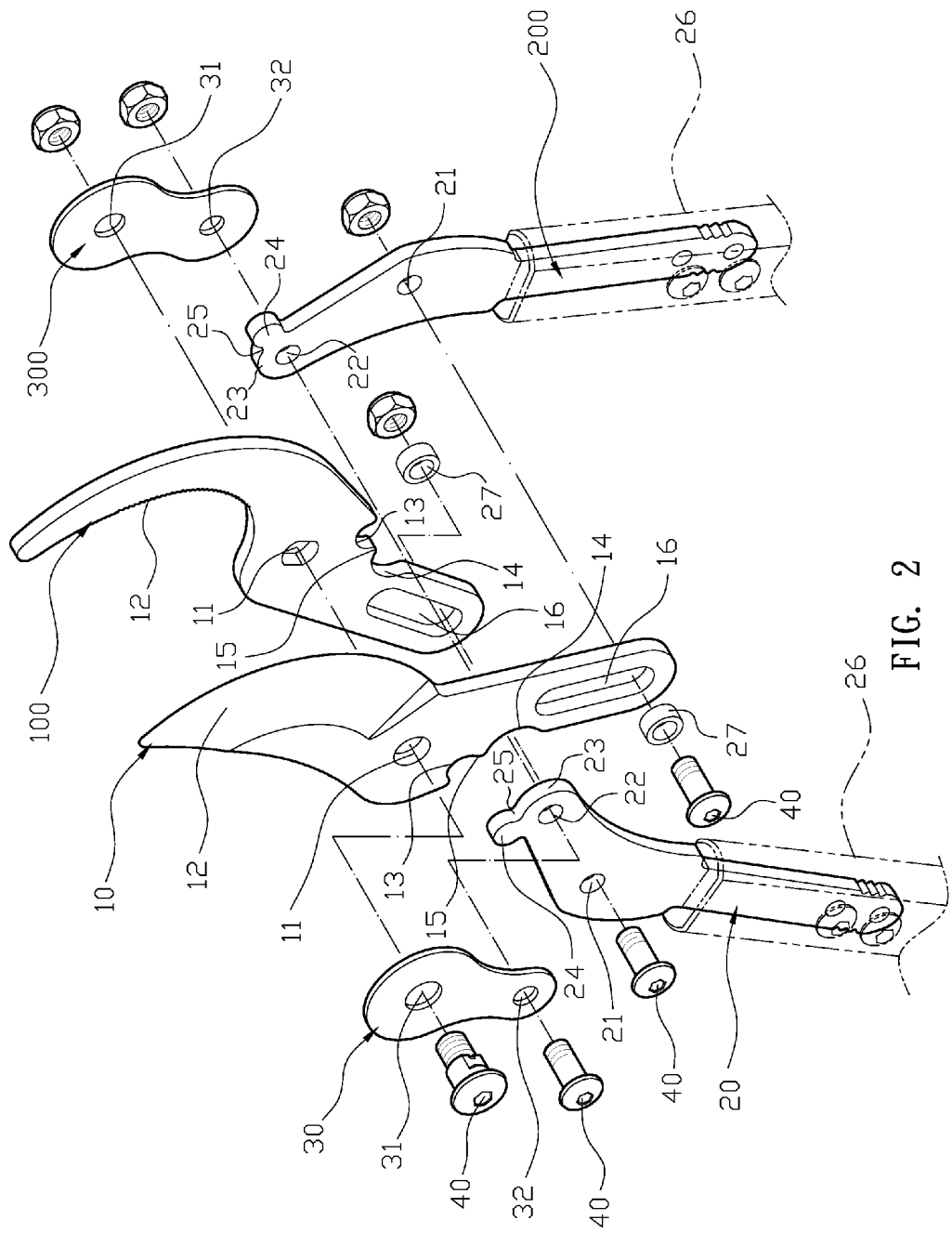
FIG. 2 is a perspective exploded view of an embodiment of the present invention.

Please refer to FIG. 1 and FIG. 2. Garden shears of an embodiment of the present invention comprise two corresponding cutting members 10, 100, two opposing applying arms 20, 200 and two assembling members 30, 300, which are assembled with corresponding securing members 40. Each cutting member 10, 100 has a main pivot aperture 11 at a middle section thereof, a blade portion 12 above the main pivot aperture 11, a pushing arc 13 and a sliding arc 14 continuously disposed below the main pivot aperture 11 and a protrusion 15 is disposed between the pushing arc 13 and the sliding arc 14. An adjustable slot 16 is disposed at a lower section. Each applying arm 20, 200 has a driving pivot aperture 21 at a middle section, an eccentric pivot aperture 22 at a top section, a rotation portion 23 corresponding to the sliding arc 14 formed at a top edge, a pushing edge 24 formed at a side of the rotation portion 23, an indentation 25 formed between the rotation portion 23 and the pushing edge 24, and a handle 26 at a lower section. The assembling member 30 is a flat member and has two securing apertures 31, 32.

Figure 3:
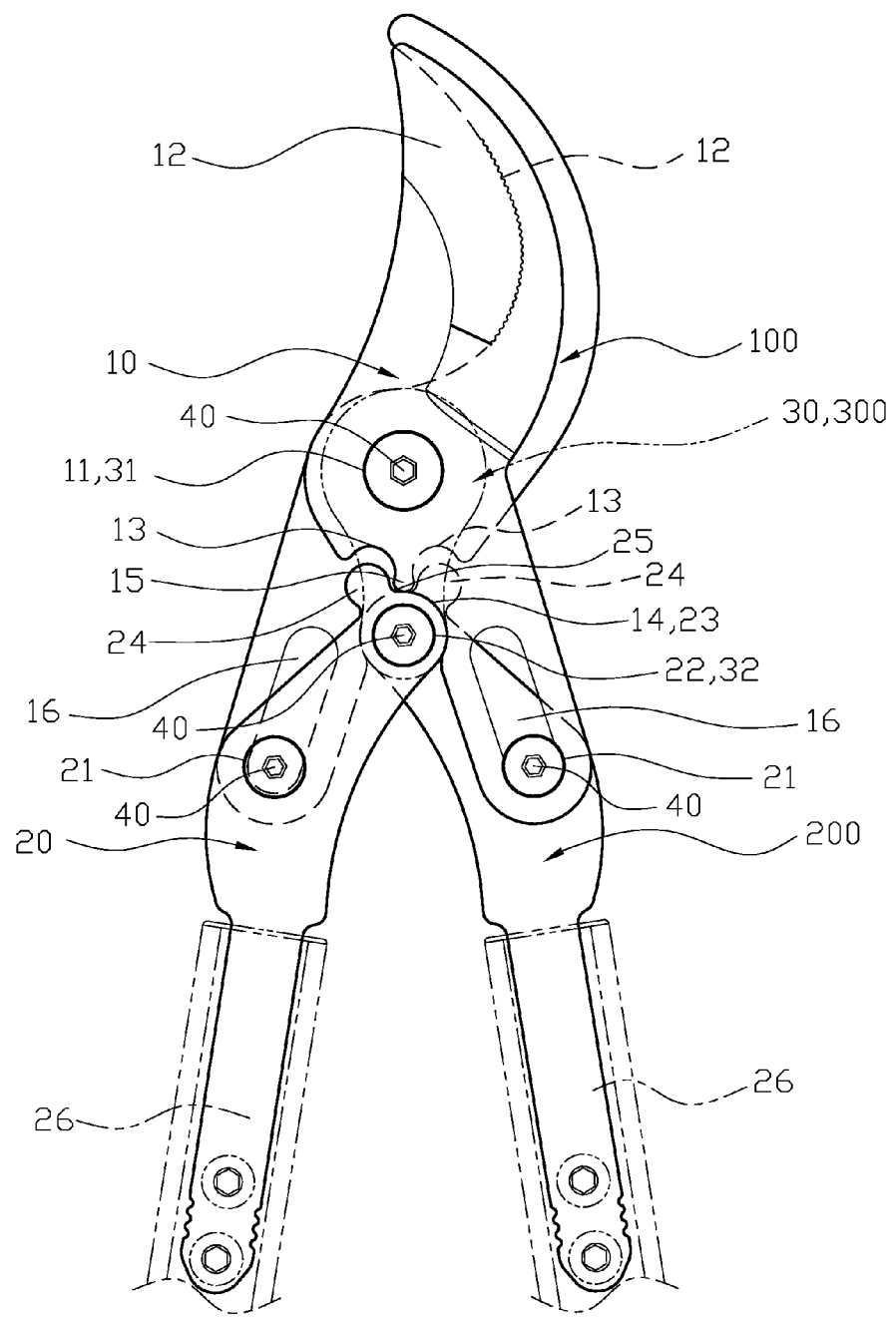
FIG. 3 is a top view of an embodiment of the present invention.

For structural assembly, please refer FIG. 3 together with FIG. 2. The two cutting members 10, 100 overlap each other. The two assembling members 30, 300 are respectively disposed on the two outside surfaces of the two overlapped cutting members 10, 100. The main pivot aperture 11 and the securing aperture 31 are aligned and locked together with the securing member 40, such that the rotation portion 23 of the applying arm 20 and the sliding arc 14 of the cutting member 10 contact each other, and the driving pivot aperture 21 of the applying arm 20 is locked with the securing member 40 and slidably installed in the adjustable slot 16 of the cutting member 100. The securing member 40 utilizes a circular column 27 disposed in the adjustable slot 16. Similarly, the rotation portion 23 of the applying arm 200 and the sliding arc 14 of the cutting member 100 contact each other, and the driving pivot aperture 21 of the applying arm 200 is locked with the securing member 40 and slidably installed in the adjustable slot 16 of the cutting member 100. The securing member 40 utilizes a circular column 27 disposed in the adjustable slot 16. The eccentric pivot aperture 22 of the applying arm 20, 200 and the securing aperture 32 of the assembling member 30, 300 are aligned with each other and locked with the securing member 40.

Figure 4:
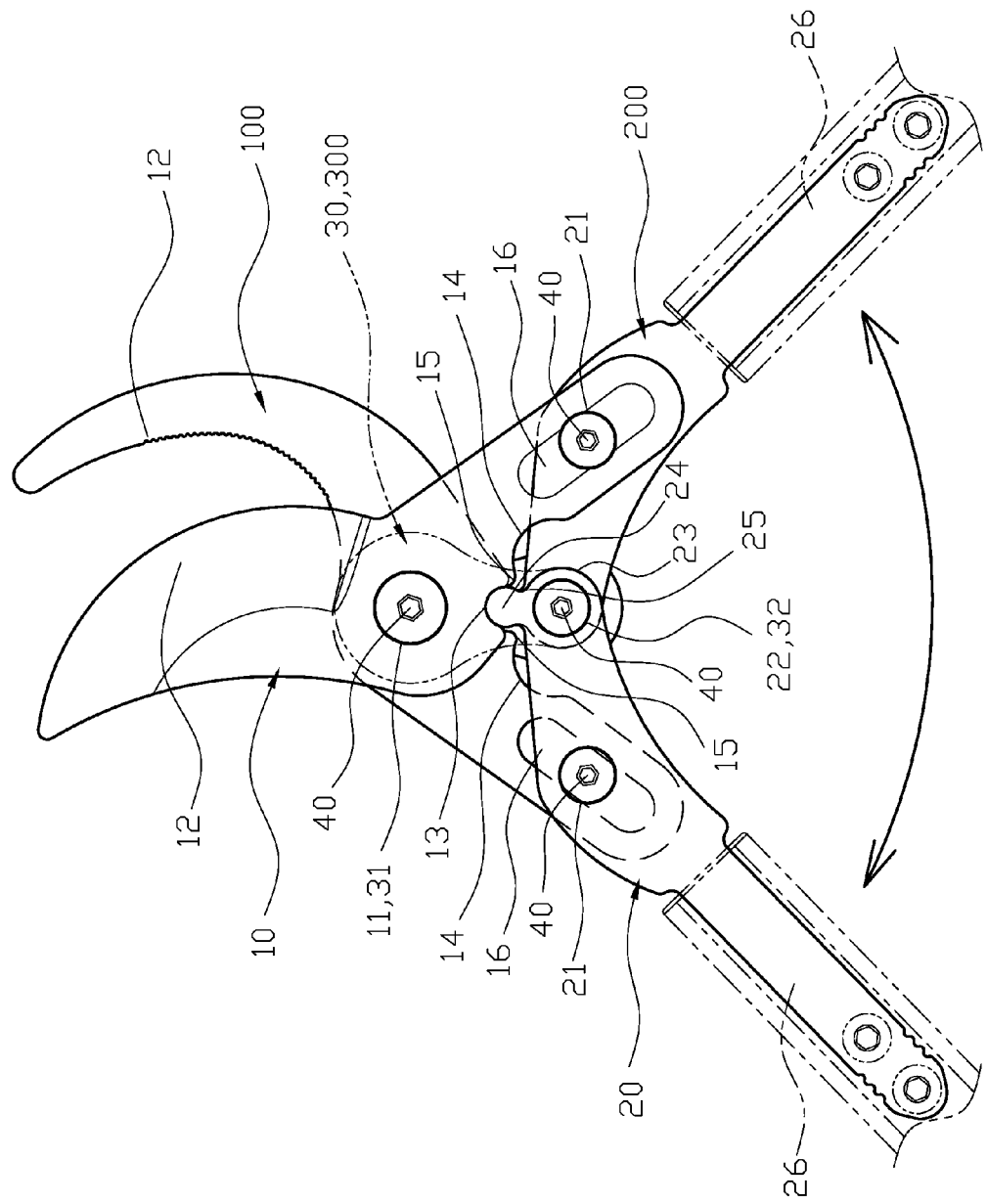
FIG. 4 illustrates an opening movement of an embodiment of the present invention.
Figure 5:
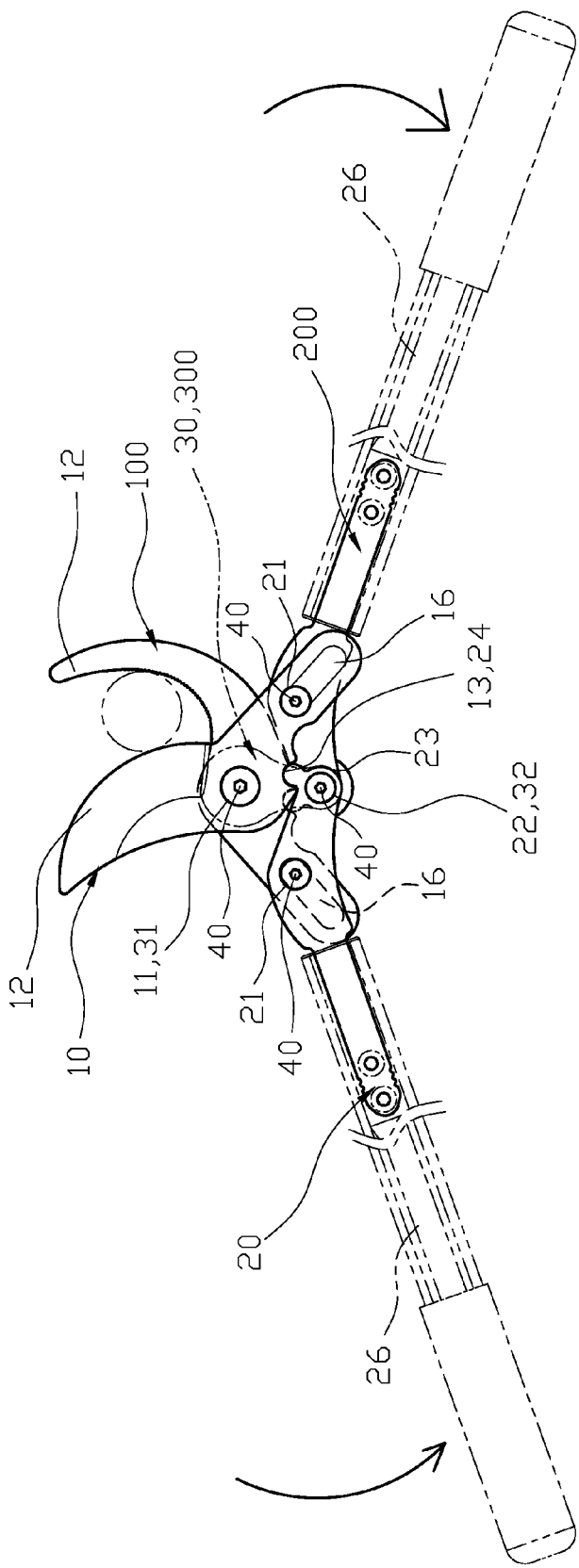
FIG. 5 shows an initial step of a cutting movement of an embodiment of the present invention.
Figure 6:
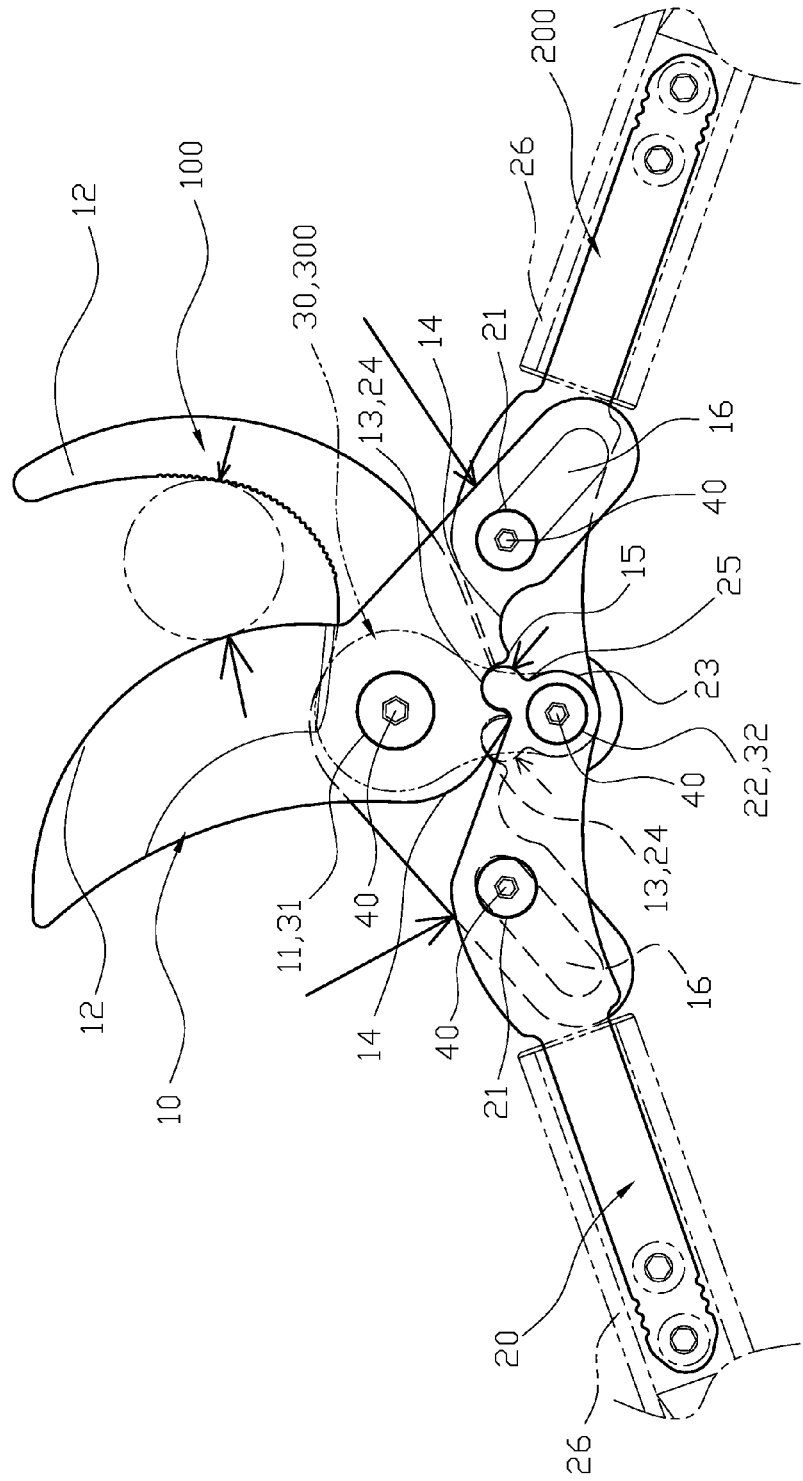
FIG. 6 is a local detailed view of a cutting movement of an embodiment of the present invention.
Figure 7:
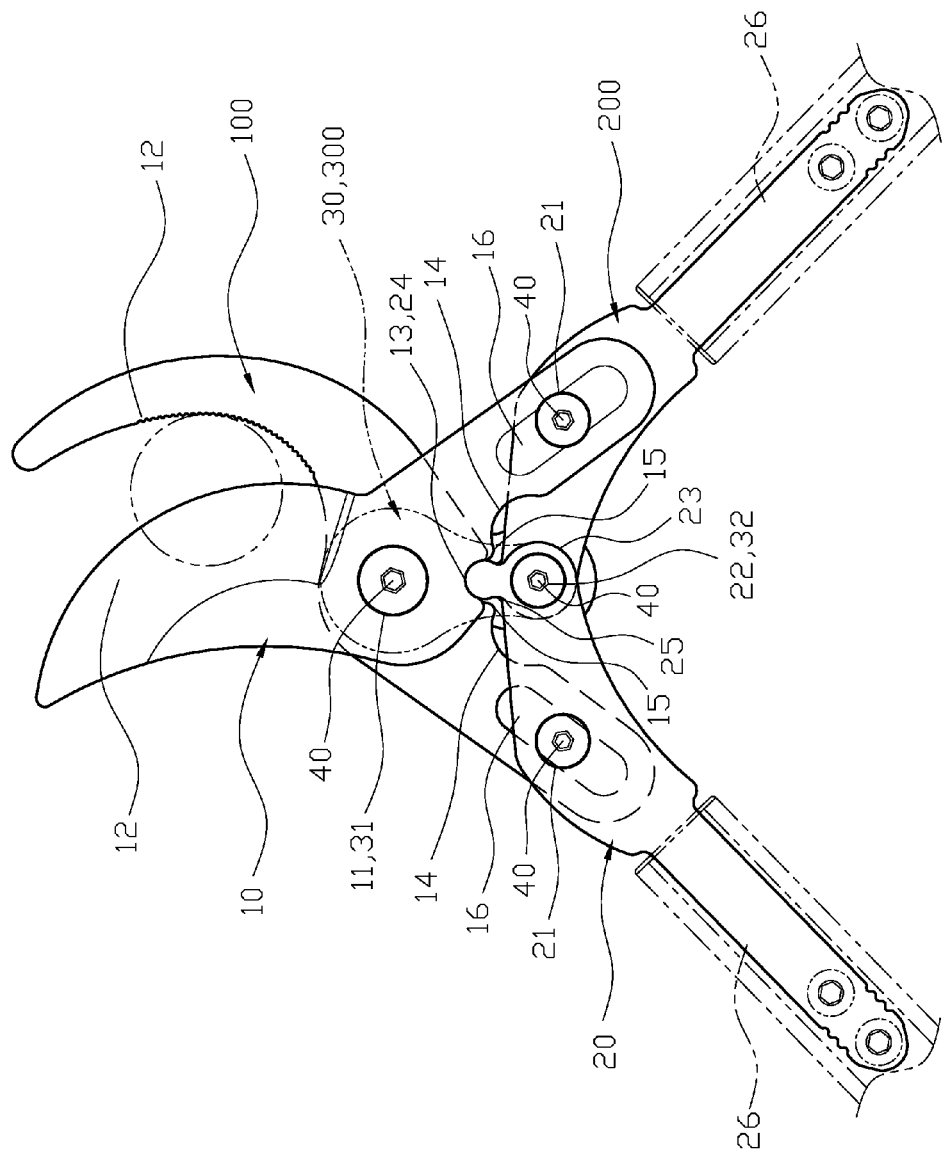
FIG. 7 shows a second step of a cutting movement of an embodiment of the present invention.
Figure 8:
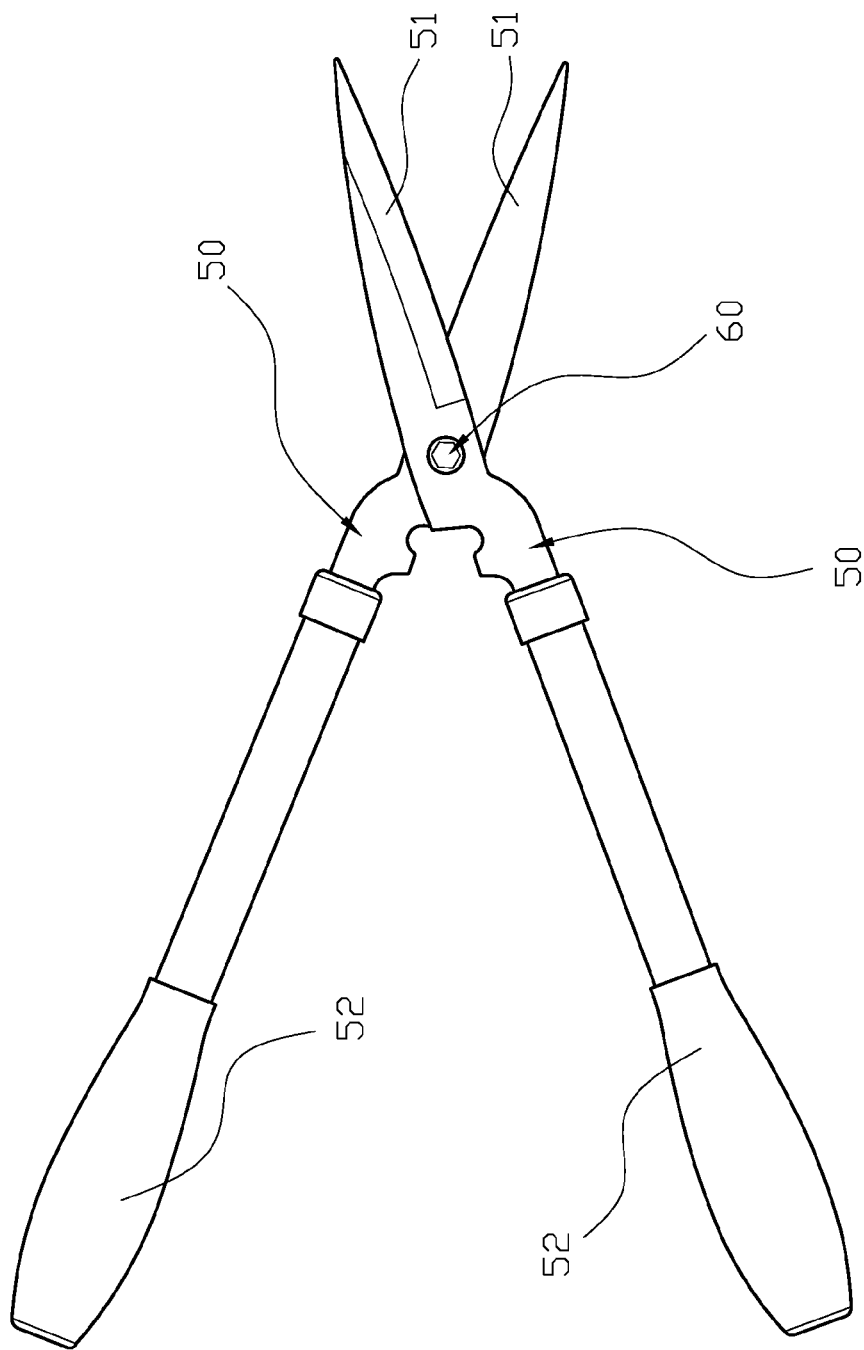
FIG. 8 is a perspective view of a prior art device.

When the cutting members 10, 100 and the applying arms 20, 200 are closed together, the blade portions 12 face each other, and the rotation portions 23 of the applying arms 20, 200 tightly contact the sliding arc 14. Therefore, the driving pivot aperture 21 is disposed at a lower end of the adjustable slot 16, as shown in FIG. 3. When a user wants to perform a cutting operation, with reference to FIG. 4 and FIG. 3, he or she opens the handles 26 of the applying arms 20, 200 such that the rotation portion 23 rotates along the sliding arc 14 and the indentation 25 is pushed by the protrusion 15. Therefore, the applying arms 20, 200 swing around the protrusion 15 to cause the pushing edge 24 to contact the pushing arc 13 and the driving pivot aperture 21 to swing outwardly. When the handles 26 of the applying arms 20, 200 are rotated outwardly more, the driving pivot aperture 21 becomes closer to the main pivot apertures 11 of the cutting members 10, 100, such that the driving pivot aperture 21 moves from the lower end of the adjustable slot 16 upwardly and the cutting members 10, 100 rotate around the main pivot aperture 11. Please refer to FIG. 7 with FIG. 6. When the handles 26 of the two applying arms 20, 200 are pushed closed to drive the cutting members 10, 100 to close to perform a cutting movement, the pushing edges 24 of the applying arms 20, 200 generate a rotatable pushing force on the pushing arc 13. When the securing apertures 32 of the assembling members 30, 300 are locked onto the two sides of the applying arms 20, 200, the securing apertures 31 are secured with the main pivot aperture 11 of the cutting member 10, 100, such that the pushing edge 24 remains in contact with the pushing arc 13 to prevent offsetting. Further, when the blade portions 12 are cutting into a target object and the interaction between the blade portions 12 and the target object increases and so requires a stronger force, the driving pivot aperture 21 moves downwardly in the adjustable slot 16 to increase the torque for the blade portions 12, as shown in FIG. 7.

With the above-mentioned structure, the following benefits can be obtained: when a user presses the handles 26 of the applying arms 20, 200 to close together, the cutting members 10, 100 are driven to close together to perform a cutting movement, such that the pushing edge 24 of the applying arm 20, 200 generates a rotatable pushing force on the pushing arc 13. Furthermore, when the blade portions 12 are cutting into a target object, the interaction between the blade portions 12 and the target object increases, which requires a stronger application force, the driving pivot aperture 21 moves downwardly in the adjustable slot 16 to increase the torque for the blade portion 12.

Although the present invention has been explained in relation to its preferred embodiment, it is to be understood that many other possible modifications and variations can be made without departing from the spirit and scope of the invention as hereinafter claimed.

What is claimed is:

1. Garden shears comprising:
    two corresponding cutting members, two opposing applying arms and two assembling members; wherein,
        each of the cutting members have a main pivot aperture at a middle section thereof, a blade portion above the main pivot aperture, a pushing arc and a sliding arc continuously disposed below the main pivot aperture and a protrusion disposed between the pushing arc and the sliding arc, and an adjustment slot at a lower section thereof;
        each of the applying arms have a driving pivot aperture at a middle section, an eccentric pivot aperture at a top section, a rotation portion corresponding to the sliding arc formed at a top edge, a pushing edge formed at a side of the rotation portion, an indentation formed between the rotation portion and the pushing edge, and a handle at a lower section; wherein each one of the assembling members is a flat member and has a first securing aperture and a second securing aperture;
        wherein the two cutting members overlap each other, the two assembling members are respectively disposed on outer portions of the two overlapped cutting members, the main pivot apertures and the first securing apertures are aligned and locked together with a first securing member, such that the rotation portion of the applying arm and the sliding arc of the cutting member contact each other, and the driving pivot aperture of each one of the applying arms is locked with a respective second securing member passing through the adjustment slot of a corresponding one of the cutting members; wherein the eccentric pivot aperture of each of the applying arms and the second securing aperture of each of the assembling members are aligned with each other and locked with a third securing member; and wherein in use the handles of the two applying arms are pushed to close together to drive the cutting members to close together to perform a cutting movement, such that the pushing edges of the applying arms generate a rotatable pushing force on the pushing arcs; and further, when the blade portions are cutting into a target object and interaction between the blade portions and the target object increases that requires a stronger force, the driving pivot aperture moves downwardly relative to the adjustment slot to increase a torque for the blade portions.

2. The garden shears as claimed in claim 1, wherein each of the applying arms further comprises at least one assembling aperture at a lower section for securing a respective one of the handles with a corresponding bolt and nut.

3. The garden shears as claimed in claim 1, wherein each of the second securing members utilize a circular column disposed in the adjustment slot of the corresponding one of the cutting members.

* * * * *